United States Patent [19]

Bächtold et al.

[11] 4,097,709
[45] Jun. 27, 1978

[54] OVEN

[75] Inventors: Jakob H. Bächtold, Meisterschwanden; Martin Dahmen, Beinwil am See, both of Switzerland

[73] Assignee: Elektromaschinen AG, Horw, Switzerland

[21] Appl. No.: 734,233

[22] Filed: Oct. 20, 1976

[30] Foreign Application Priority Data

Dec. 17, 1975 Switzerland ............. 16327/75

[51] Int. Cl.² .................................................. H05B 9/06
[52] U.S. Cl. ............................................... 219/10.55 R
[58] Field of Search ............... 219/10.55 R, 10.55 A, 219/10.55 B, 10.55 F

[56] References Cited

U.S. PATENT DOCUMENTS

| | | | |
|---|---|---|---|
| 3,195,013 | 7/1965 | Thal, Jr. | 219/10.55 B |
| 3,440,385 | 4/1969 | Smith | 219/10.55 R |
| 3,611,582 | 10/1971 | Hamid et al. | 219/10.55 A |
| 3,670,134 | 6/1972 | Bucksbaum | 219/10.55 B |
| 3,854,219 | 12/1974 | Staats | 219/10.55 R |

FOREIGN PATENT DOCUMENTS

| | | | |
|---|---|---|---|
| 649,299 | 11/1962 | Italy | 219/10.55 R |
| 1,172,918 | 12/1969 | United Kingdom | 219/10.55 R |
| 1,164,278 | 9/1969 | United Kingdom | 219/10.55 F |

*Primary Examiner*—J. V. Truhe
*Assistant Examiner*—Clifford C. Shaw
*Attorney, Agent, or Firm*—Werner W. Kleeman

[57] ABSTRACT

An oven or cooking appliance having a baking or oven compartment which can be heated by circulating air and can be furnished with microwaves by means of a microwave generator. At the underside of the microwave generator, in spaced relationship from the ceiling of the oven compartment, there is provided a heat shield or screen. A waveguide which is leakproof for microwaves and substantially hermetically sealed against the oven compartment but permeable to microwaves in the direction of the oven compartment is provided with air permeable walls. Blower means feed cooling air between the heat shield and the ceiling of the oven compartment and through the waveguide.

7 Claims, 3 Drawing Figures

U.S. Patent  June 27, 1978  4,097,709
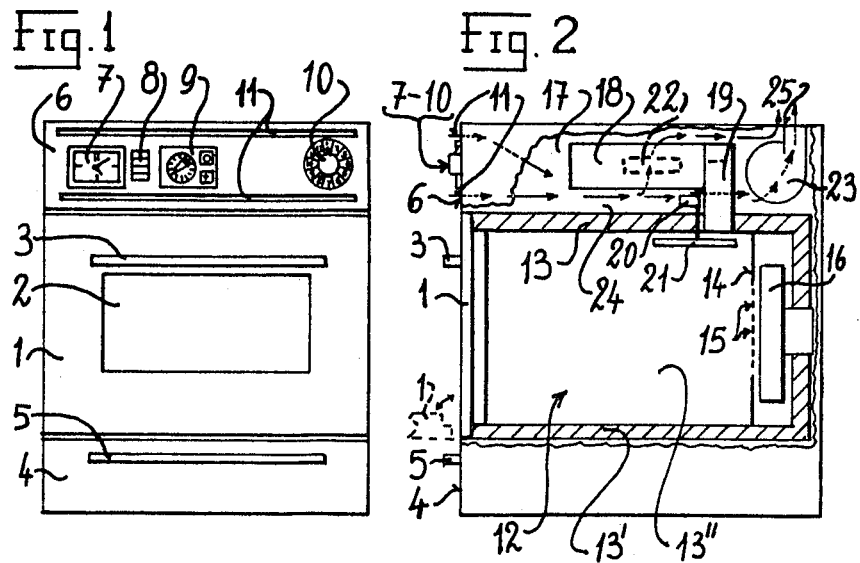
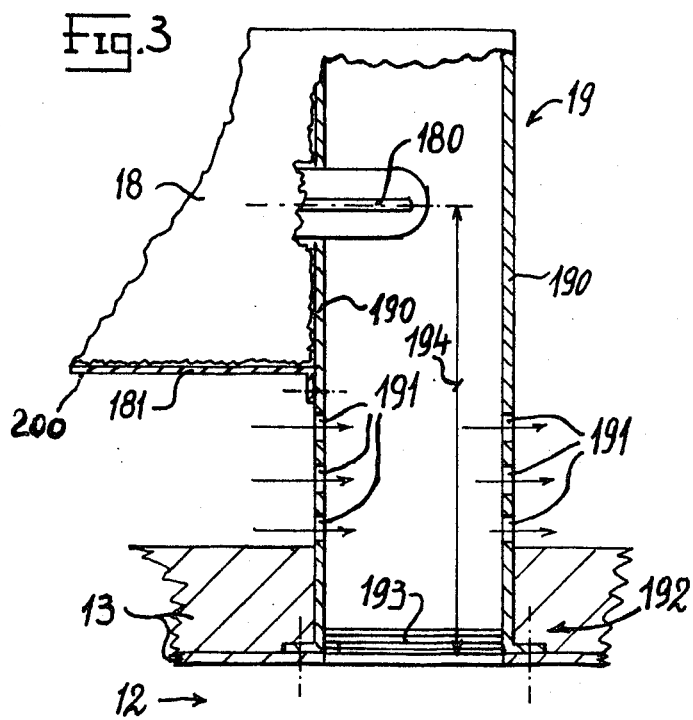

OVEN

BACKGROUND OF THE INVENTION

The present invention relates to a new and improved construction of a cooking appliance, hereinafter referred to usually as a baking oven, having a baking or oven compartment which can be heated by circulating air and supplied with microwaves from a microwave generator.

Microwave generators have thermal losses, the heat of which is withdrawn by blower means provided in the generator. If such microwave generators are used in combination with a circulating air heater of the oven compartment, then particular problems arise due to the thermal losses of the oven compartment notwithstanding the provision of appropriate thermal insulation, because the microwave generator, which is an electronic device, is quite heat sensitive. Therefore, as a general rule, the microwave generator heretofore was arranged such that it would not be overly exposed to the thermal action of the baking or oven compartment. Yet, this is associated with unfavorable conditions from the standpoint of spatial requirements and efficiency.

SUMMARY OF THE INVENTION

Hence, it is a primary object of the present invention to provide a new and improved construction of cooking appliance of the previously mentioned type which is not associated with the aforementioned drawbacks and limitations of the prior art constructions.

Another and more specific object of the present invention aims at overcoming the drawbacks of the state-of-the-art baking ovens of the aforementioned type, and protecting the microwave generator against excessive thermal exposure, while still providing a space saving and compact arrangement.

Due to its flat construction the microwave generator only requires very little space in the housing of the baking oven, facilitating its arrangement above the baking or oven compartment, without having to exceed the conventional structural height of the housing for circulating air ovens or having to appreciably modify the circulating air oven. The thus housed microwave generator is, however, placed at the hottest location of the baking oven, which unfavorably influences its operational reliability and longevity. It not only receives the entire thermal losses radiated by the baking or oven compartment and the thermal losses emitted by the ceiling of the oven compartment, but furthermore its waveguide additionally functions as a direct thermal bridge.

Due to the combination of the measures provided by the invention, namely the heat shield arranged in spaced relationship from the ceiling of the baking oven, a most intensive airtight however microwave pervious closure of the waveguide against the oven compartment and the blower means, conveying cooling air between the heat shield and the oven compartment and through the waveguide provided with air permeable but microwave-tight or leakproof walls, it is nonetheless possible to improve the efficiency and the longevity as well as the operational reliability of the microwave generator. This is accomplished to such a degree that the effective length of the waveguide can be dimensioned shorter than the wavelength of a microwave, although in consequence thereof the thermal bridge from the oven compartment to the microwave generator must be designed to be very short.

In contrast to the arrangement of a microwave generator at a different location, for instance, laterally, behind or beneath the oven compartment, here there is realized the notable advantage that the circulating air-baking oven is not affected by the spatial requirements.

The infeed of microwaves from below, apart from the loss in space otherwise used for a heatable appliance drawer, would result in the drawback that the spacing of the infeed location of the microwaves into the oven compartment from the food to be cooked would be very short, resulting in unfavorable field distribution. Furthermore, cleaning problems would arise because any liquids or detergents which have spilled-out or drained-off would flow downwardly, could contact the microwave generator and damage the same. Further, the microwaves, along their path from the infeed location to the food to be cooked must also penetrate the carrier base or floor upon which there has been placed the food to be cooked (possibly in a vessel).

The wave polarization should be as parallel as possible to the blown-in hot air, which would be possible when arranging the microwave generator below or above the baking compartment. Yet, the arrangement below the baking or oven compartment would be associated with the previously discussed drawbacks, whereas the arrangement above the oven compartment is prejudiced by the hottest position above the oven compartment. Fortunately this prejudice could be overcome by the teachings of the present invention.

The heat screen or shield can advantageously consist of polished chromium-nickel steel which combines the advantage of comparatively poor thermal conductivity with that of good thermal reflection. An appropriately dimensioned chromium-nickel steel sheet or plate can simultaneously serve as the chassis of the microwave generator or in fact its housing. Consequently, a saving in space is possible, particularly when a comparison is made with other heat reflecting and relatively poor thermally conducting materials and combinations of materials.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic front view of a baking oven constructed according to the present invention, illustrated on a strongly reduced scale;

FIG. 2 is a schematic, partially sectional side view, of such baking oven shown on the same scale as in FIG. 1; and FIG. 3 is a schematic and enlarged section of FIG. 2, taken at the region of the waveguide and partially shown in sectional view.

DETAILED DESCRIPTION OF THE PREFERRED EMBODIMENTS

Describing now the drawings, at the front of the illustrated baking oven there is located a door 1 having a window 2 and a door handle 3, this door 1 can be opened by being folded down. Of course, the door 1 also could be opened by carrying out a movement in another direction, for instance by tilting the same up. The door window 2 is protected against the emission of microwaves in any conventional manner and therefore by not particulary illustrated means. The door 1 closes the oven compartment or chamber 12 of the baking oven so that it is leakproof against microwaves i.e. microwave-tight.

Below the door 1 there is located a drawer 4 for appliances, this drawer can be heated and its front plate is equipped with a suitable gripping handle 5.

Above the door 1 there is located a control panel 6 comprising a timing clock or switch 7 for determining the cooking or baking time. Adjacent the timing switch 7 there are provided control lamps 8 or other suitable indicators, neighboring which there is located a short-time counter (microchronometer) or switch 9 with switching elements for setting into operation the microwave generator 18 only for a short operating period. At the right of the control panel 6 there is arranged a program selector 10 for selecting the various baking or cooking programs.

The baking compartment or chamber 12 possesses a ceiling 13, a floor 13′, two side walls 13″ and a rear wall 14. The ceiling or cover 13, the floor 13′ and the side walls 13″ are insulated and also behind a heating blower or hot air blower 16 there is provided such insulation, which has not been particularly referenced, for heat insulation purposes. The rear wall 14 possesses at its center and along both of the side walls 13″ a multiplicity of holes or apertures 15, and the blower 16 sucks up air by means of the central holes and after possibly heating the same again blows such through the lateral holes adjacent the side walls 13″ back into the oven compartment 12. The rear wall 14 is microwave-tight.

Above the ceiling 13 of the oven compartment 12 there is located a chamber or compartment 17 in which there is arranged the microwave generator 18 with a waveguide 19 opening into the oven compartment 12. In the waveguide 19 there is housed an antenna 180 oriented substantially parallel to the side walls 13″ of the oven compartment 12. As best seen by referring to FIG. 3, the microwaves transmitted by the antenna 180 and supplied by means of the waveguide 19 into the oven compartment 12 are polarized parallel to the direction of the air which is blown-in by the blower 16 into the oven compartment 12, which results in good efficiency.

In the compartment or chamber 17 there is also located the motor 20 of a field distributor disc 21 rotatable in the oven compartment 12 ahead of the point of entry of the waveguide 19.

For the conventional cooling of the microwave generator 18 a blower 22 is arranged within the latter. This blower 22 conveys the air, entering the compartment 17 through the openings 11 of the control panel 6, through the microwave generator 18. The air then leaves the not particularly referenced housing at location 25.

A further blower 23 sucks air through the openings 11 of the control panel 6 into the compartment 17 between the ceiling 13 of the oven compartment 12 and a heat screen or shield 181 (FIG. 3) of the microwave generator 18 and through the waveguide 19 (FIG. 3) and expels such likewise at location 25 out of the oven housing. In this way there is avoided heat transfer between the oven compartment 12 and the microwave generator 18.

For purposes of attaining the desired cooling effect the waveguide 19 is provided with air permeable walls 190 which are microwave-tight, which in this case can be achieved by perforating the walls 190, for instance with holes or perforations 191 of about 5 mm diameter. The foregoing is but exemplary and is in no way intended to be limiting of the invention. Further, at the end 192 of the waveguide 19 which opens into the oven or baking compartment 12 there is provided a closure, for instance in the form of a suitable glass disc 193, which should be as airtight as possible but permeable as much as possible to microwaves.

The antenna 180 is disposed substantially parallel to the side walls 13′ of the oven compartment 12. The effective length 194 of the waveguide 19 between the antenna 180 and its end 192 amounts to less than a wavelength of the microwaves.

The microwave generator 18 has a flat construction and contains all of its components in a housing 200, the lower side or base of which confronting the ceiling 13 of the oven compartment 12, consists of heat reflecting and relatively poor heat conducting material and forms the heat shield or screen 181. Polished or bright chromium-nickel steel may be advantageously used as the aforementioned material. Other suitable materials or combinations of materials may alternatively be used. The waveguide 19 also can be formed of chromium-nickel steel.

In this manner it is possible to realize the afore-mentioned advantages, without unnecessarily impairing the construction of the hot air portion. There is thus possible optimum utilization of the energy of both systems, namely, hot air and microwaves. The cool air flow prevailing in the compartment 17 has a beneficial effect upon other electronic devices housed therein, so that the heat resistance thereof need not be overly taxed.

While there are shown and described present preferred embodiments of the invention, it is to be distinctly understood that the invention is not limited thereto, but may be otherwise variously embodied and practiced within the scope of the following claims. ACCORDINGLY,

What is claimed is:

1. A baking oven comprising means defining an oven compartment, means for heating the oven compartment with circulating air, a microwave generator for furnishing the oven compartment with microwaves, said oven compartment including a ceiling, said microwave generator being located above said oven compartment and having an underside, a heat shield provided at the underside of the microwave generator in spaced relationship from the ceiling of the oven compartment, waveguide means closed against the oven compartment substantially airtight but permeable to microwaves in the direction of the oven compartment but otherwise impermeable to microwaves, said waveguide means having air permeable walls, and blower means for feeding cooling air between the heat shield and the ceiling of the oven compartment and in a direction extending transversely through the waveguide means by means of said air permeable walls thereof.

2. The baking oven as defined in claim 1, wherein said waveguide means has an effective length amounting at most to the wavelength of a microwave.

3. The baking oven as defined in claim 1, wherein the walls of the waveguide means possess perforations of a size in the order of magnitude of about 5 mm.

4. The baking oven as defined in claim 1, wherein the waveguide means is structured such that the microwaves are polarized essentially parallel to the air flow conveyed by the air circulating heating means into the oven compartment.

5. The baking oven as defined in claim 1, wherein the heat shield contains chromium-nickel steel.

6. The baking oven as defined in claim 1, wherein the waveguide means contains chromium-nickel steel.

7. A baking oven comprising means defining an oven compartment, a microwave generator for furnishing the oven compartment with microwaves, said oven compartment including a ceiling, said microwave generator being located above said oven compartment and having an underside, a heat shield provided at the underside of the microwave generator in spaced relationship from the ceiling of the oven compartment, waveguide means closed against the oven compartment substantially airtight but permeable to microwaves in the direction of the oven compartment but otherwise impermeable to microwaves, said waveguide means having air permeable walls, and blower means for feeding cooling air between the heat shield and the ceiling of the oven compartment and transversely through the waveguide means by means of said air permeable walls thereof.

* * * * *